United States Patent
Grove et al.

(10) Patent No.: US 8,438,933 B2
(45) Date of Patent: May 14, 2013

(54) FLOWMETER AND MANIFOLD THEREFOR

(75) Inventors: William D. Grove, Boalsburg, PA (US); Brandon A. Tarr, State College, PA (US); Gerald W. Johnston, Beech Creek, PA (US); Thomas E. Kane, Port Matilda, PA (US)

(73) Assignee: Restek Corporation, Bellefonte, PA (US)

( * ) Notice: Subject to any disclaimer, the term of this patent is extended or adjusted under 35 U.S.C. 154(b) by 863 days.

(21) Appl. No.: 12/460,246

(22) Filed: Jul. 15, 2009

(65) Prior Publication Data

US 2011/0011185 A1    Jan. 20, 2011

(51) Int. Cl.
  *G01F 1/00*    (2006.01)
(52) U.S. Cl.
  USPC ............................................................ 73/861
(58) Field of Classification Search ............... 73/861.18, 73/203
  See application file for complete search history.

(56) References Cited

U.S. PATENT DOCUMENTS 5,723,783 A * 3/1998 Woodward ...................... 73/203

* cited by examiner

*Primary Examiner* — Jewel V Thompson

(57) ABSTRACT

An acoustic displacement flowmeter for determining flow rate of a fluid has a fluid flow line defining a flow path for the fluid. The fluid flow line has an inlet and an outlet. A controllable valve is positioned along the fluid flow line for opening and closing the flow path as desired, and an acoustic displacement transducer having a fluid port is coupled to the fluid flow line upstream from the controllable valve. The outlet of the fluid flow line extends through a wall isolating fluid exhausted from the outlet of the fluid flow line from electrical and/or mechanical components residing inside the flowmeter, thereby preventing the exhausted fluid, if explosive, from contacting such electrical and/or mechanical components which may act as potential ignition sources. Preferably, a manifold having a rigid body is provided in which the fluid flow line is formed. An acoustic displacement transducer (ADT) chamber wall is formed on the manifold body, and has an ADT chamber inlet port formed therein, and the fluid flow line has a branched portion connecting the fluid flow line to the ADT chamber inlet port. The outlet of the fluid flow line extends through a wall formed in the manifold body to isolate fluid exhausted from the outlet of the fluid flow line from electrical and/or mechanical components residing inside the flowmeter.

15 Claims, 7 Drawing Sheets

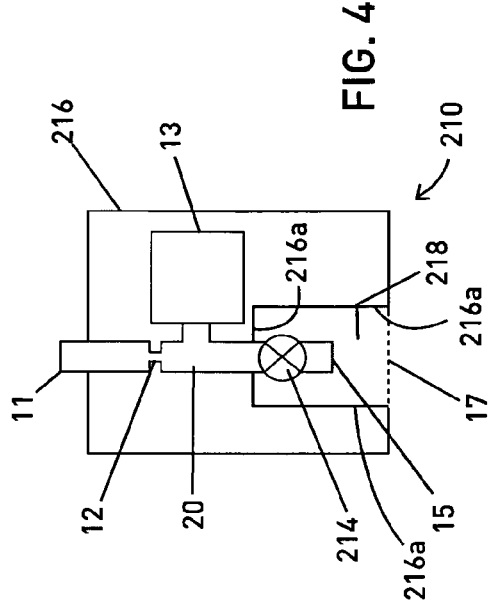
FIG. 4
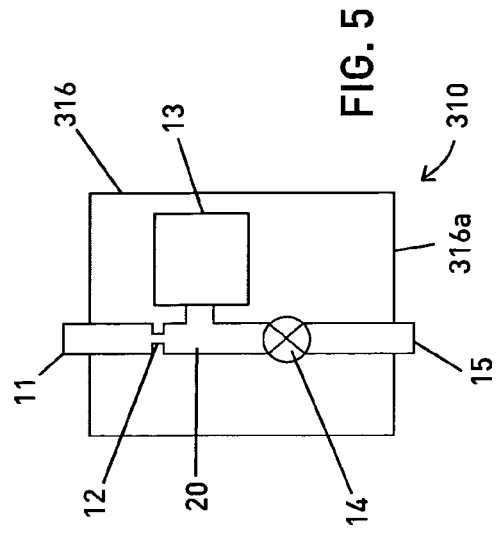
FIG. 5
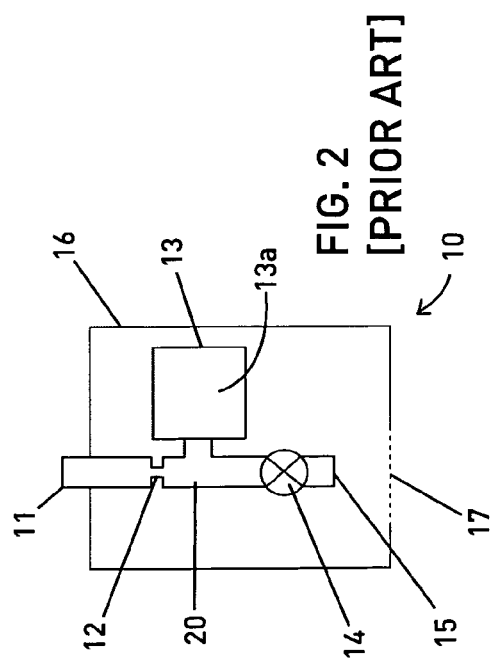
FIG. 2 [PRIOR ART]
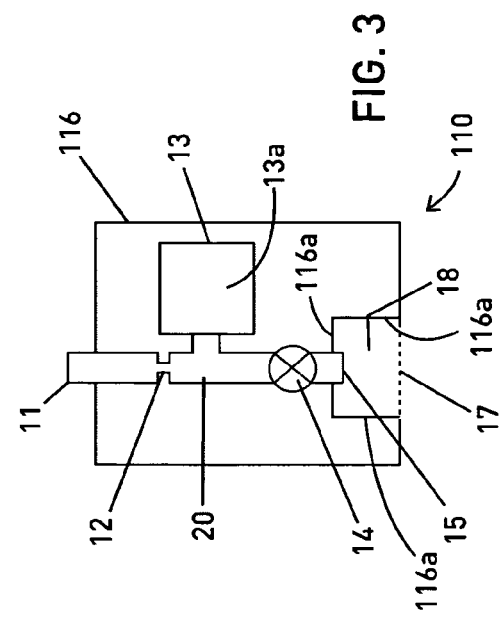
FIG. 3

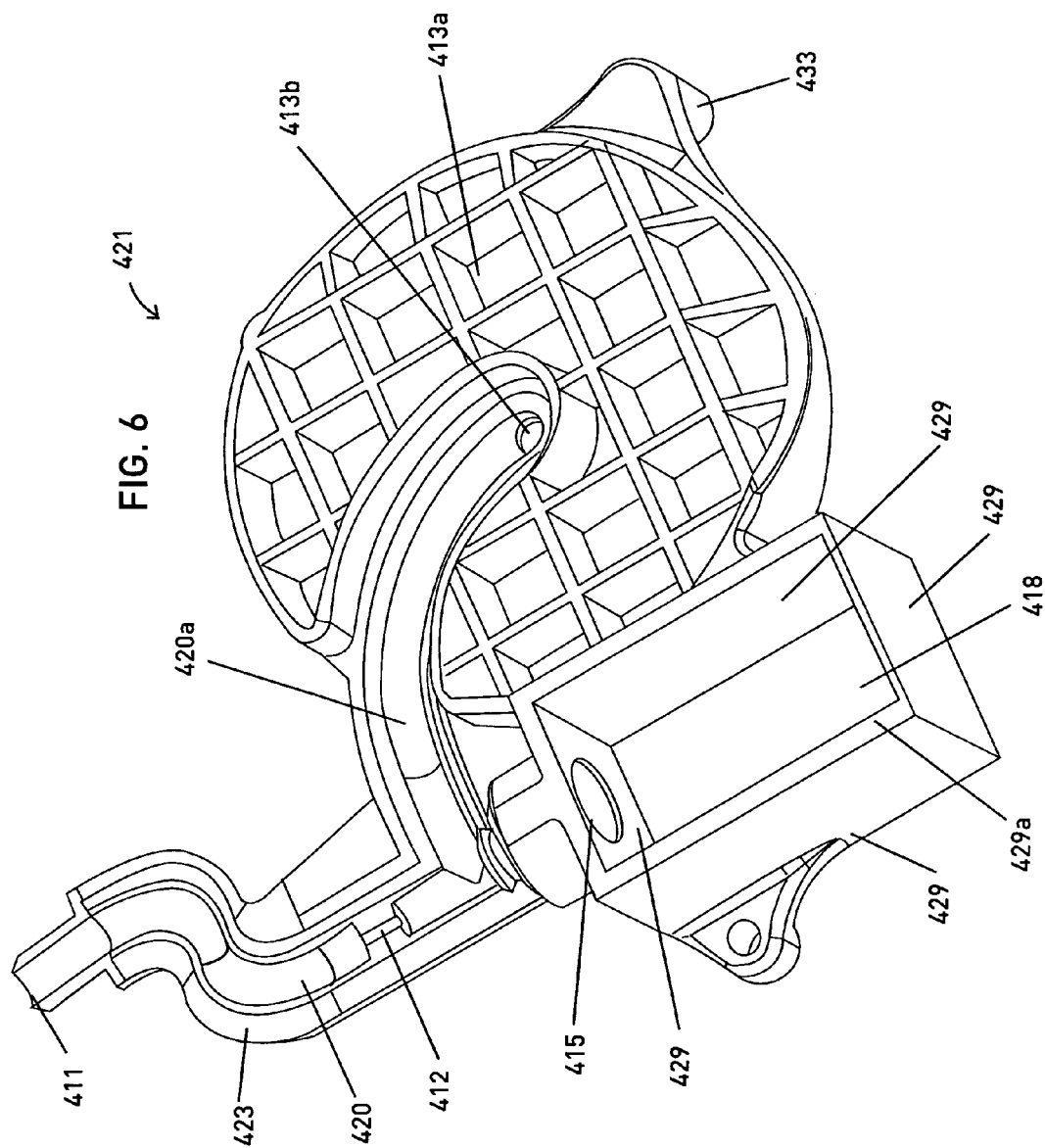

FLOWMETER AND MANIFOLD THEREFOR

BACKGROUND OF THE INVENTION

1. Field of the Invention

This invention relates to volumetric flowmeters, and more particularly concerns acoustic displacement flowmeters for determining flow rate of fluids (e.g., gases) commonly used in chromatography.

2. Description of the Prior Art

Volumetric flow measurement devices 10 exist that employ acoustic displacement transducer (ADT) technology. In such devices 10, gas is passed through a channel 20 in the device 10 which includes a precision orifice restriction, a reservoir or chamber containing an acoustic displacement transducer (ADT), and a normally open low dead volume valve 14. FIG. 1 illustrates the flow path in such volumetric flow measurement devices 10 under flow conditions.

FIG. 2 illustrates current flowmeter technology. Related commercially available products include the Agilent ADM1000, the ADM2000, and the ADM3000 flowmeters. Patents relating to current flowmeter technology include U.S. Pat. Nos. 5,460,038, 5,540,104, 5,723,783, European Patent EP 0 553 550, and European Patent EP 0 672 893, all of which are incorporated herein by reference. As shown in FIG. 2, the probe gas inlet 11 is affixed to a gas source or vacuum source, not shown (the system is also equipped to measure vacuum, or negative flow). The gas flows through the device 10 with the first restriction being the precision orifice 12. A measurement is made when the valve 14 closes and the gas, instead of flowing from the valve 14 to the exhaust 15, flows from the flow path upstream of the valve 14 into the ADT chamber 13a of the acoustic displacement transducer 13. In this device 10, the ADT sensor is a conventional audio speaker. When the valve 14 shuts, the chamber 13a containing the speaker "inflates" and moves the speaker cone position. The gas flow rate measurement relates to the rate of deflection of the speaker. After the measurement is made, the valve 14 opens and the gas vents through exhaust 15. In currently known devices 10, the exhaust 15 resides inside the flowmeter enclosure or housing 16 and may eventually exit the device 10 through holes 17 found in the enclosure or housing 16.

Current flowmeter technology vents the gas stream from the valve 14 directly into the device 10, thereby exposing the gas to all electronic and mechanical components resident in the device 10. In cases where non-explosive gases are employed (e.g., helium), it is not necessary to isolate the gas from potential ignition sources (e.g., electronic and mechanical components) that reside inside the device 10. However, in cases where the flow measurement relates to an explosive gas (e.g., hydrogen), there exists a danger of explosion due to such explosive gas coming into contact with potential ignition sources (e.g., electronic and mechanical components) that reside within the device 10.

SUMMARY OF THE INVENTION

It is an object of the invention to provide an acoustic displacement flowmeter that mitigates against an explosive gas exploding in the flowmeter.

This and other objects of the invention are provided by the invention, which is described below.

BRIEF DESCRIPTION OF THE DRAWINGS

FIG. 2 is a schematic view of a conventional acoustic displacement flowmeter;

FIG. 3 is a schematic view of an acoustic displacement flowmeter constructed in accordance with our invention;

FIG. 4 is a schematic view of an alternative embodiment of the invention;

FIG. 5 is a schematic view of another alternative embodiment of the invention;

FIG. 6 is a prospective view of a manifold constructed in accordance with the invention, with a portion being cut away to show the interior of the fluid flow line 420 formed in the manifold;

DETAILED DESCRIPTION

Figure 1:
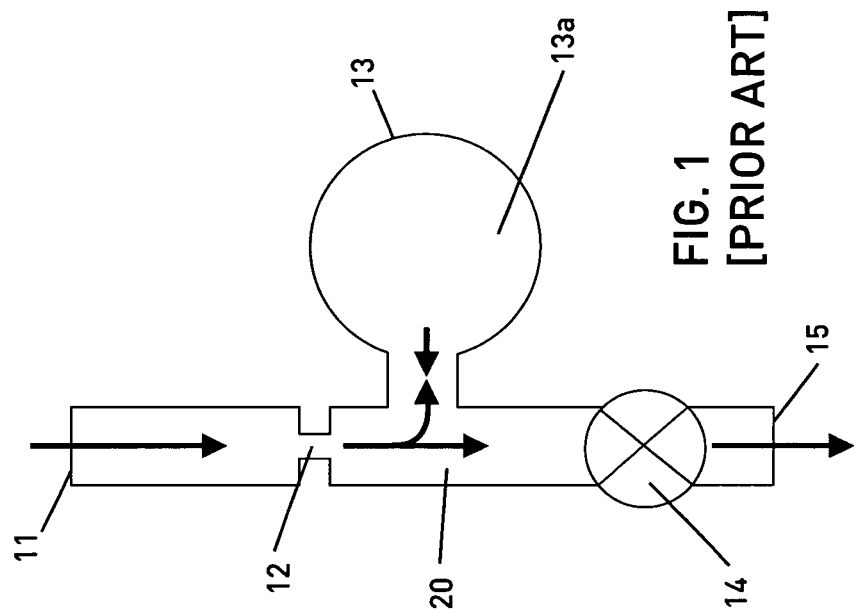
FIG. 1 is a schematic drawing illustrating flow of a fluid in a conventional acoustic displacement flowmeter under positive pressure flow condition.

Turning to the drawings, and in particular to FIG. 3, there is shown a preferred first embodiment of our inventive of our inventive acoustic displacement flowmeter 110 for determining flow rate of a fluid from a fluid source (or to measure vacuum (or negative flow) from a vacuum source).

In this embodiment of the invention, the flowmeter 110 has an enclosure or housing 116.

A fluid flow line 20 located in the housing 116 defines a flow path for the fluid. The fluid flow line 20 has an inlet 11 adapted to be fitted to a fluid source or a vacuum source, and the fluid flow line 20 has an outlet 15 through which fluid may exhaust from the fluid flow line 20.

A precision orifice restriction 12 is formed along the fluid flow line 20, and a controllable valve 14 is positioned along the fluid flow line 20 for opening and closing the flow path as desired.

An acoustic displacement transducer 13 is provided, and has a fluid port adapted to be coupled to the fluid flow line 20 upstream from the controllable valve 14.

The fluid flow line 20 extends through a wall 116a that forms a portion of the enclosure or housing 116 of the flowmeter 110 or sealingly engages the enclosure or housing 116 to permit fluid flowing in the fluid flow line 20 when the controllable valve 14 is open to be directly exhausted into an exhaust chamber 18, which is defined by wall 116a, and then from the exhaust chamber 18 through holes 17 formed in the housing 116 to outside of the housing 116, thereby isolating the exhausted fluid from the potential ignition sources (e.g., electronic and/or mechanical components) that reside in the flowmeter housing 116 that may cause the exhausted fluid if explosive (e.g., hydrogen) to explode. Accordingly, since the fluid exhausted from the outlet 15 is isolated from the electrical and/or mechanical components residing inside the flowmeter 110, the danger of explosion in the flowmeter 110 caused by exhausted fluids, if explosive, contacting the electrical and/or mechanical components residing inside the flowmeter 110 that may act as an ignition source is avoided. The preferred embodiment illustrated in FIG. 3 is useful when the controllable valve 14 employs a single exhaust port.

FIG. 4 illustrates another preferred embodiment of the invention. The inventive flowmeter 210 of this embodiment is similar to the flowmeter 110 illustrated in FIG. 3, except a controllable valve 214 having multiple vent ports on more than one side is used in place of valve 14. Like flowmeter 110, the flowmeter 210 is provided with an exhaust chamber 218 that is very similar to the exhaust chamber 18 illustrated in FIG. 3. Exhaust chamber 218 is defined by a wall 216a that forms a portion of the enclosure or housing 216 of the flowmeter 210 or sealingly engages the enclosure or housing 216. In this embodiment, the end portion of the fluid flow line 20 containing the controllable valve 214 extends through the wall 216a and into the exhaust chamber 218 such that such end portion, including the valve 214, is surrounded by the wall 216a. With this arrangement, fluid may be directly exhausted into the exhaust chamber 218 and then from the exhaust chamber 218 through holes 17 formed in the housing 216 to outside the housing 216. The wall 216a isolates fluid exhausted from the outlet 15 from the electrical and/or mechanical components residing inside the flowmeter 210, thereby ensuring that any explosive fluid passing through the fluid flow line 20 has been isolated from the interior portion of the flowmeter 210 where potential ignition sources (e.g., electrical and/or mechanical components) reside inside the flowmeter 210.

FIG. 5 illustrates another preferred embodiment of the invention. The inventive flowmeter 310 of this embodiment is similar to the flowmeter 110 illustrated in FIG. 3, except rather than being provided in an exhaust chamber 18, the fluid flow line 20 of flowmeter 310 extends through a wall 316a that forms a portion of the housing 316 directly to the exterior of the flowmeter 310. With this arrangement, fluid may be directly exhausted to outside of the flowmeter 310. The wall 316a isolates fluid from the outlet 15 from the electrical and/or mechanical components residing inside the flowmeter 310, thereby ensuring that any explosive fluid passing through the fluid flow line 20 has been isolated from the interior portion of the flowmeter 310 where potential ignition sources (e.g., electrical and/or mechanical components) reside inside the flowmeter 310.

Figure 7:
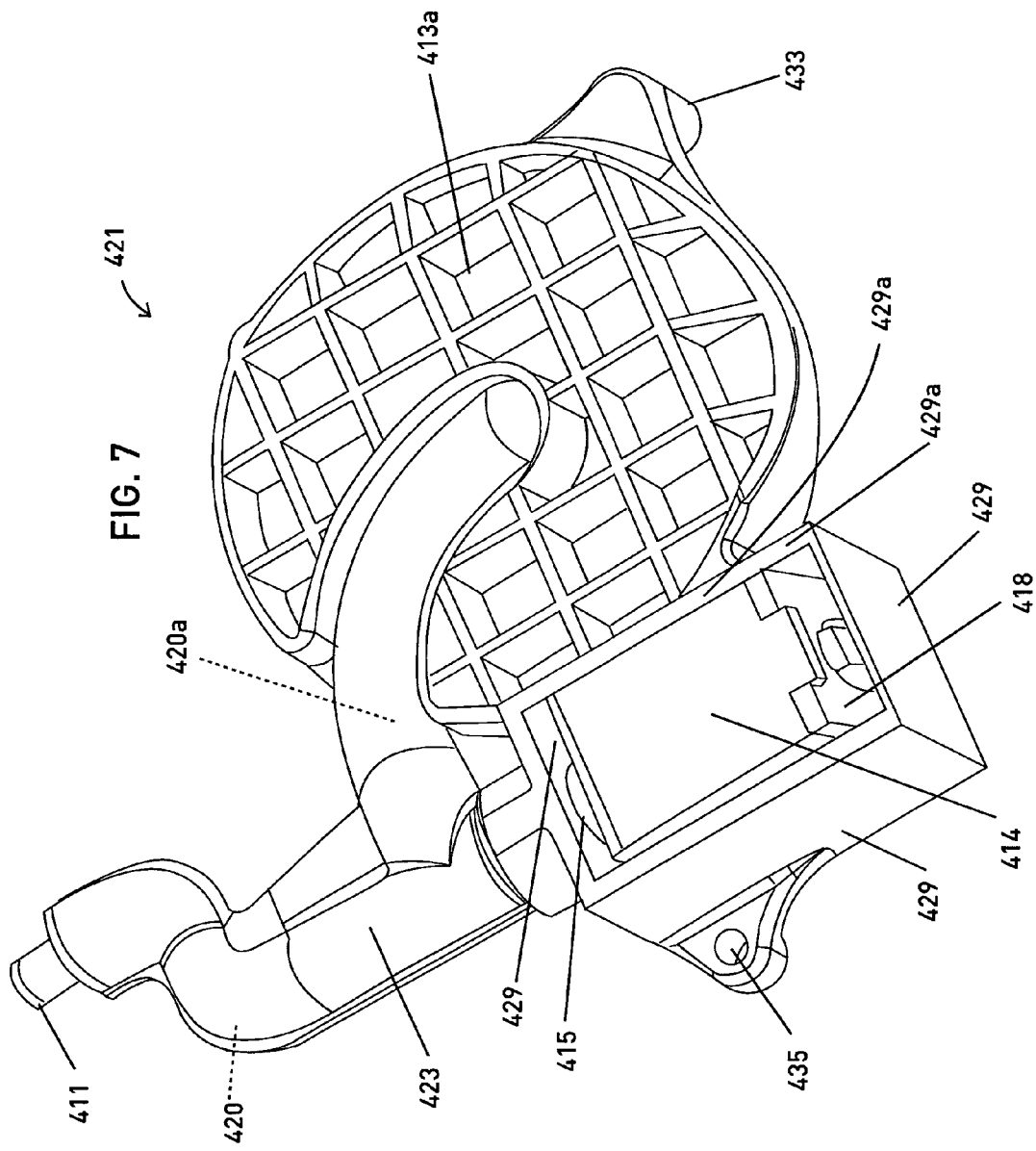
FIG. 7 is a prospective view of the manifold shown in FIG. 6 without the cut away view and with a controllable valve positioned therein.
Figure 8:
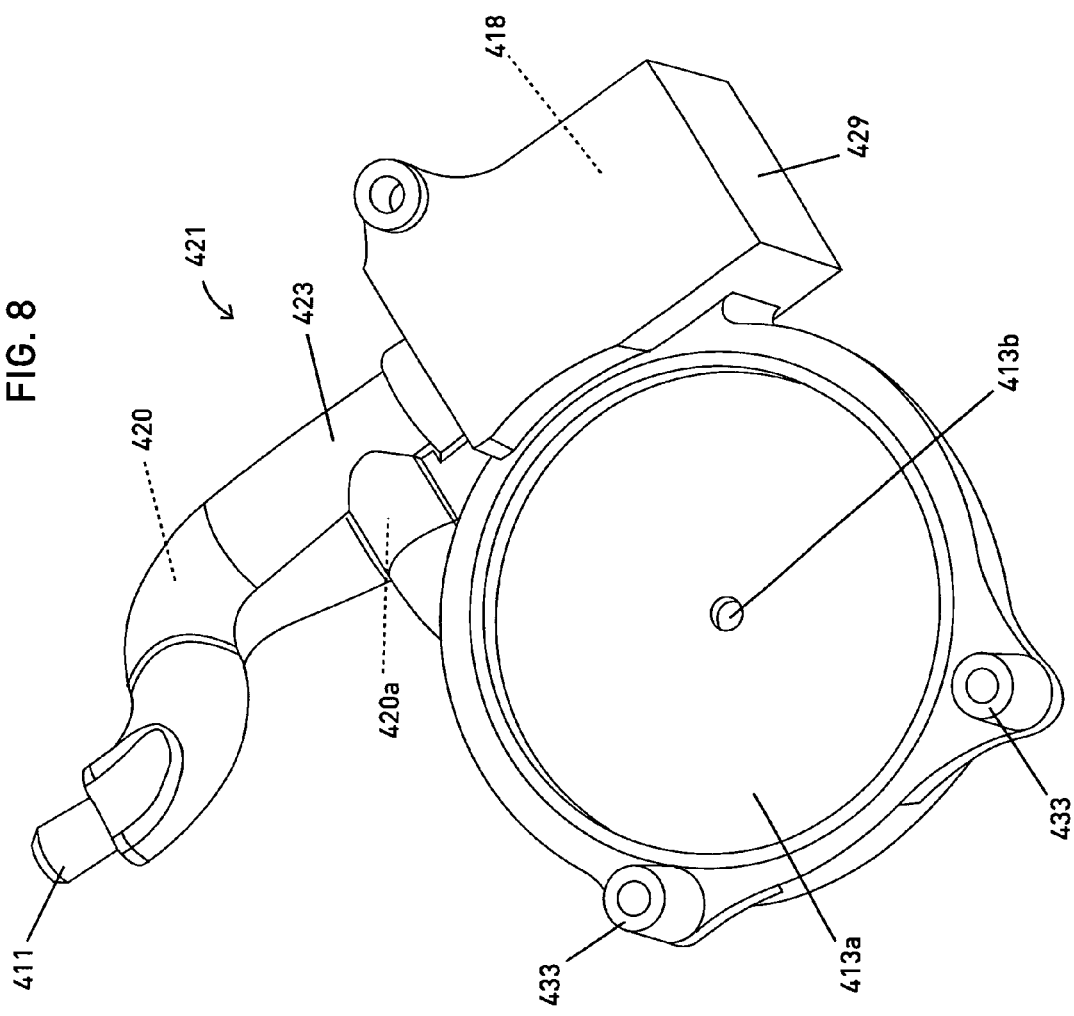
FIG. 8 is a prospective view of the manifold shown in FIGS. 6 and 7, but viewed from the opposite side.

Turning next to FIGS. 6 to 8, there is shown a preferred inventive manifold 421 for the flowmeters of the invention. The use of the inventive manifold 421 permits the flow path elements to be consolidated into a single rigid structure. This simplifies the assembly process and ensures greater lot-to-lot performance uniformity as opposed to designs which employ multiple pieces of flexible tubing in separate housings for components along the flow path. The manifold 421 comprises a manifold body 423 having a fluid flow line 420 integrally formed in the manifold body 423 and extending through the manifold body 423. The fluid flow line 420 defines a flow path for fluid, and the fluid flow line 420 has an inlet 411 and an outlet 415. The fluid flow line 420 also has a branched portion 420a that extends to an acoustic displacement transducer chamber inlet port 413b formed in an acoustic displacement transducer chamber wall 413a formed on the manifold body 423.

A precision orifice restriction 412 is formed along the fluid flow line 420 in the manifold body 423 upstream of the branched portion 420a.

As shown in FIG. 7, a controllable valve 414 may be positioned along the fluid flow line 420 in the manifold body 423 downstream of the branch portion 420a for opening and closing the flow path as desired.

Figure 9:
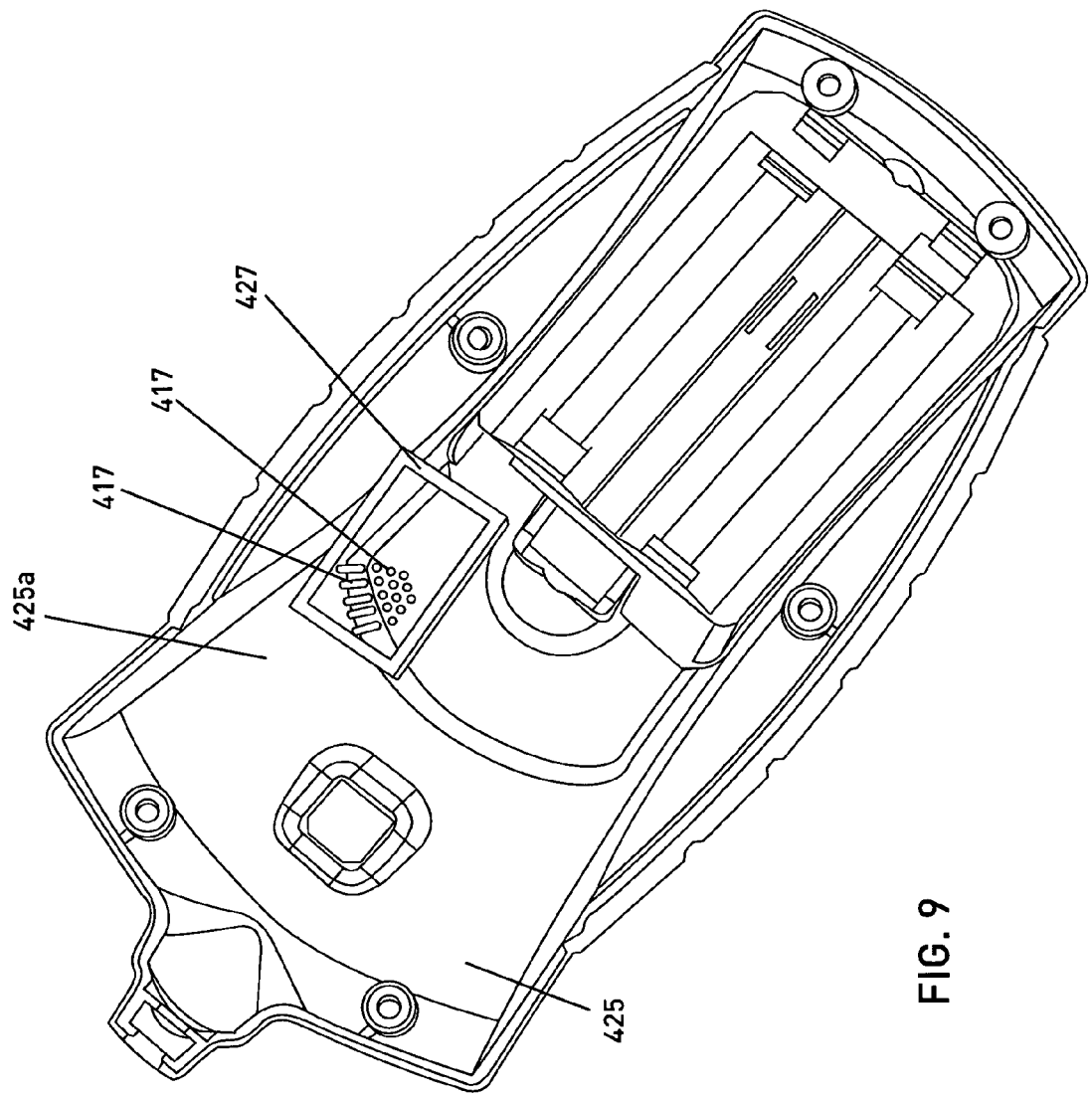
FIG. 9 is a plan view of the interior side of a shell enclosure or casing member 425 that engages the manifold.
Figure 10:
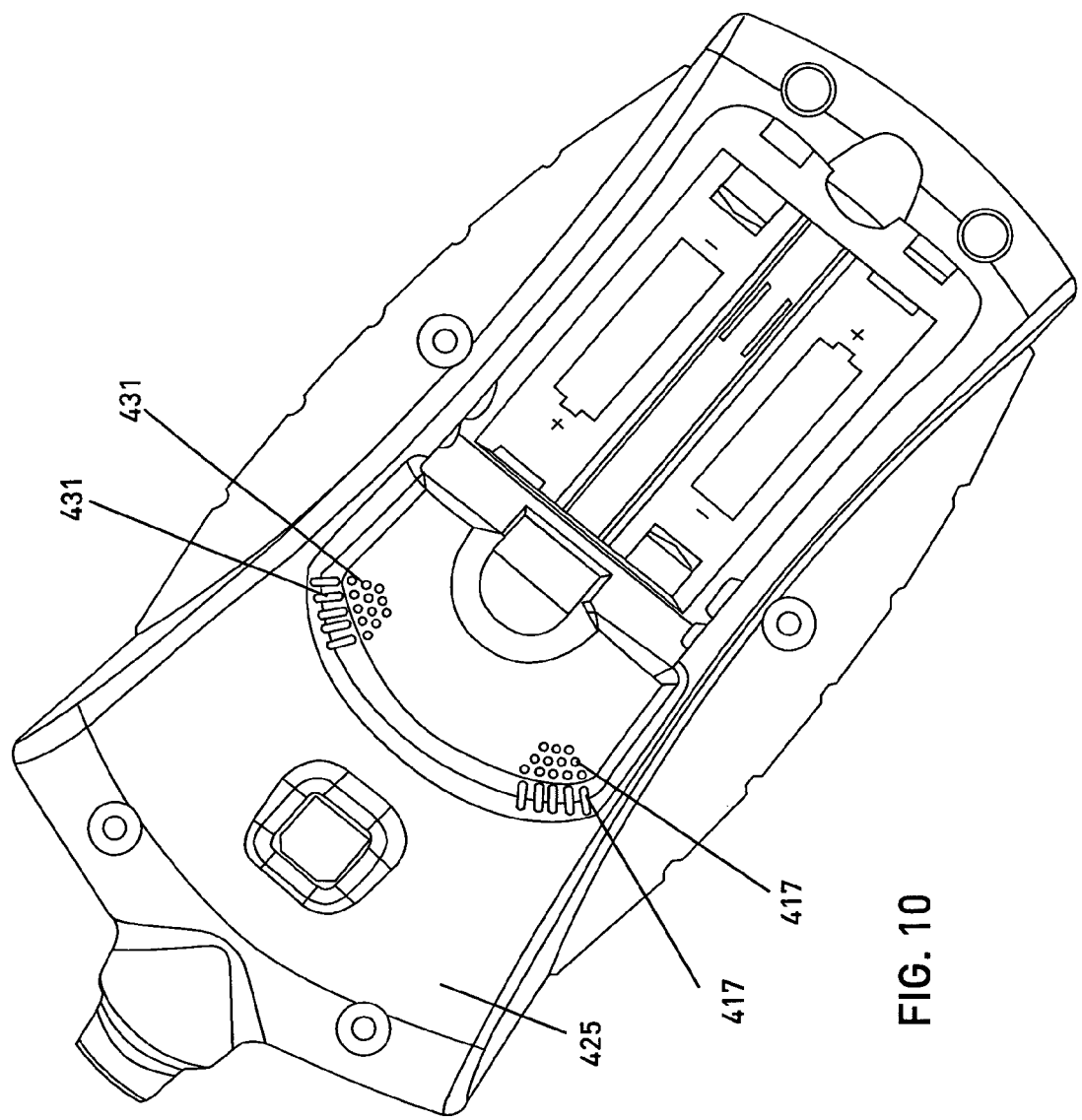
FIG. 10 is a plan view of the exterior side of the shell enclosure or casing member 425 shown in FIG. 9.

A shell enclosure or casing member 425 (FIG. 9) which forms part of the enclosure or housing of the flowmeter of the invention has a rectangularly-shaped wall 427 that extends away from the interior side of the body portion 425a of the casing member 425 and sealingly engages the rim 429a of a rectangularly-shaped wall 429 formed in the manifold body 423 to form a housing into which the controllable valve 414 is placed and to form an exhaust chamber 418. Vent holes 417 are provided in the casing member 425, as shown in FIGS. 9 and 10, to permit fluid exhausted from the outlet 415 of the fluid flow line 420 to move from the exhaust chamber 418 to outside the flowmeter of the invention. Since the fluid flow line 420 extends through the wall 429 causing the flow path of the fluid flow line 420 to feed directly from the fluid flow line 420 into the exhaust chamber 418, fluid being exhausted from the outlet 415 of the fluid flow line 420 flows directly into the exhaust chamber 418 and then exits the exhaust chamber 418 through the vent holes 417 to outside the inventive flowmeter. The wall 429 isolates fluid exhaust from the outlet 415 of the fluid flow line 420 from the electrical and/or mechanical components residing inside the inventive flowmeter, thereby insuring that any explosive fluid passing through the fluid flow line 420 has been isolated from the interior portion of the inventive flowmeter where potential ignition sources (e.g., electrical and/or mechanical components) reside inside the inventive flowmeter.

Referring to FIG. 10, decorative indents 431, which are surface features and do not penetrate through the casing member 425, are provided in the outer surface of the casing member 425 to match the appearance of the vent holds 417.

Connection members 433 (e.g., lugs for receiving bolts or the like) are formed on the manifold body 423 for permitting the acoustic displacement transducer chamber wall 413a formed on the manifold body 423 to be connected to another part of an acoustic displacement transducer. Also, a connection member 435 (e.g., a lug for receiving a bolt or the like) is provided for permitting the manifold body 423 to be connected to another part of the inventive flowmeter.

The manifold body 423 preferably is made of a rigid material, such as a metal, a rigid plastic, or a rigid polymeric material. Preferably, the manifold body 423 is made via injection molding of a polycarbonate.

The manifold body 423 preferably is provided with grid of intersecting walls 437 to reinforce the strength of the acoustic displacement transducer chamber wall 413a.

In use, with each of the embodiments of the inventive flowmeter, flow of fluid is established along the flow path defined by the fluid flow line. When the flow rate of the fluid is to be measured, the controllable valve is closed, causing the fluid in the fluid flow line to be directed to the acoustic displacement transducer. Using the acoustic displacement transducer, the flow rate of the fluid may be determined. After the flow rate measurement is taken, flow of fluid may be reestablished along the flow path by opening the controllable valve, thereby resulting in flow of fluid being directed from the outlet of the flow path. Since the outlet of the flow path extends through a wall that isolates fluid exhausted from the outlet of the flow path from electrical and/or mechanical components residing inside the inventive flowmeter, the exhausted fluid does not come into contact with such electrical and/or mechanical components residing inside the flow meter.

In accordance with the invention, the fluid flowing through the flowmeter is isolated from the electronic and/or mechanical components inside the flowmeter other than the components inside the fluid flow line and the acoustic displacement transducer chamber. Accordingly, since the fluid exhausted from the outlet of the fluid flow line is isolated from the electrical and/or mechanical components (which may be potential ignition sources for fluids that are explosive) residing inside the flowmeter, the danger of explosion in the flowmeter caused by exhausted fluids, if explosive, contacting the electrical and/or mechanical components residing inside the flowmeter that may act as an ignition source is avoided.

Conventional specifications known in the art may be used for the inventive flowmeters to provide a range and sensitivity appropriate for chromatography related applications. The flowmeters of the invention are non-gas specific in that they may be used to measure flow rates for all gases commonly used in the chromatography business, without requiring additional setups or configurations.

The invention claimed is:

1. A flowmeter for determining the flow rate of a fluid in a path formed in a flow path manifold, the flowmeter having a housing in which the manifold is located, said manifold comprising:
    (a) a gas inlet to the path;
    (b) a controllable valve located along the path for opening and closing the path as desired;
    (c) a displacement transducer having a fluid port adapted to be coupled to said path upstream from the controllable valve; and
    (d) a gas outlet, the gas outlet of the manifold extending through the housing to permit fluid to be exhausted from flowmeter while isolating fluid exhausted from the gas outlet from electrical and/or mechanical components residing inside the flowmeter.

2. The flowmeter of claim 1, where the flow path manifold is a single rigid assembly.

3. A method of determining the flow rate of a fluid flowing along a flow path, said method comprising the steps of:
    (a) establishing fluid flow along the flow path, the flow path being contained within an enclosure of a flowmeter;
    (b) directing the fluid flow to a transducer by restricting the flow path downstream from the transducer, the transducer having a displacement element;
    (c) reestablishing fluid flow along the flow path by no longer restricting the flow path downstream from the transducer; and
    (d) when the fluid flow is not being restricted downstream from the transducer, directing the fluid flow downstream from the transducer to outside the enclosure of the flowmeter to isolate fluid exhausted from the flowmeter from electrical and/or mechanical components residing inside the flowmeter.

4. An acoustic displacement flowmeter for determining flow rate of a fluid, comprising
    a fluid flow line defining a flow path for the fluid, the fluid flow line having an inlet and an outlet,
    a controllable valve positioned along the fluid flow line for opening and closing the flow path as desired, and
    an acoustic displacement transducer having a fluid port adapted to be coupled to the fluid flow line upstream from the controllable valve,
    the outlet of the fluid flow line extending through a wall isolating fluid exhausted from the outlet of the fluid flow line from electrical and/or mechanical components residing inside the flowmeter.

5. An acoustic displacement flowmeter for determining flow rate of a fluid, comprising
    a fluid flow line defining a flow path for the fluid, the fluid flow line having an inlet and an outlet,
    a controllable valve positioned along the fluid flow line for opening and closing the flow path as desired, and
    an acoustic displacement transducer having a fluid port adapted to be coupled to the fluid flow line upstream from the controllable valve,
    the outlet of the fluid flow line extending through a wall isolating fluid exhausted from the outlet of the fluid flow line from electrical and/or mechanical components residing inside the flowmeter, and further including
    a manifold,
    the manifold having a manifold body, the manifold body being a single rigid component, the fluid flow line being formed in the manifold body, and
    an acoustic displacement transducer chamber wall being formed on the manifold body,
    the acoustic displacement transducer chamber wall having an acoustic displacement transducer chamber inlet port formed therein, and
    the fluid flow line having a branched portion connecting the fluid flow line to the acoustic displacement transducer chamber inlet port.

6. The acoustic displacement flowmeter of claim 5, further including
    a precision orifice restriction formed along the fluid flow line in the manifold body upstream of the branched portion.

7. The acoustic displacement flowmeter of claim 5, further including
    an exhaust chamber formed in the manifold body into which the fluid flow line leads.

8. The acoustic displacement flowmeter of claim 5,
    the controllable valve being positioned along the fluid flow line in the manifold body downstream of the branched portion of the fluid flow line.

9. The acoustic displacement flowmeter of claim 5, further including
    a connection member formed on the manifold body for permitting the acoustic displacement transducer chamber wall formed on the manifold body to be connected to another portion of the acoustic displacement transducer.

10. A manifold for an acoustic displacement flowmeter for determining flow rate of a fluid, comprising
    a manifold body,
    a fluid flow line located in and extending through the manifold body, the fluid flow line defining a flow path for fluid, the fluid flow line having an inlet and an outlet, and the fluid flow line having a branched portion, and
    an acoustic displacement transducer chamber wall formed on the manifold body,
    the acoustic displacement transducer chamber wall having an acoustic displacement transducer chamber inlet port formed therein, and
    the branched portion of the fluid flow line connecting the fluid flow line to the acoustic displacement transducer chamber inlet port.

11. The manifold of claim 10, further including
    a precision orifice restriction formed along the fluid flow line in the manifold body upstream of the branched portion.

12. The manifold of claim 10, further including
    an exhaust chamber formed in the manifold body into which the fluid flow line leads.

13. The manifold of claim 10, further including
    a controllable valve positioned along the fluid flow line in the manifold body downstream of the branched portion for opening and closing the flow path as desired.

14. The manifold of claim 10, further including
    a connection member formed on the manifold body for permitting the acoustic displacement transducer chamber wall formed on the manifold body to be connected to another part of an acoustic displacement transducer.

15. A method for determining flow rate of a fluid along a flow path of a flowmeter, comprising the steps
    establishing flow of fluid along a flow path of a flowmeter, the flow path having an inlet and an outlet, directing flow of fluid to an acoustic displacement transducer having a displacement element by restricting the flow path downstream from the transducer, using the transducer to determine flow rate of the fluid, reestablishing flow of fluid along the flow path by no longer restricting the flow path downstream from the transducer, and, when the flow of fluid is not being restricted downstream from the transducer, directing flow of fluid from the outlet of the flow path, the outlet of the flow path extending through a wall isolating fluid exhausted from the outlet of the flow path from electrical and/or mechanical components residing inside the flowmeter.

* * * * *